UNITED STATES PATENT OFFICE.

CARL A. KELLER AND BERTRAND G. JAMIESON, OF CHICAGO, ILLINOIS.

COMPOSITION OF MATTER FOR AND PROCESS OF MAKING INSULATING MATERIAL.

No. 915,774.  Specification of Letters Patent.  Patented March 23, 1909.

Application filed December 26, 1907. Serial No. 408,186.

*To all whom it may concern:*

Be it known that we, CARL A. KELLER and BERTRAND G. JAMIESON, citizens of the United States, residing at Chicago, in the county of Cook and State of Illinois, have invented certain new and useful Improvements in Compositions of Matter for and Processes of Making Insulating Material, of which the following is a full, clear, concise, and exact description.

The object of our invention is to provide an electrical insulating material which is electrically indestructible and of high insulating properties, mechanically strong and capable of inexpensive production. The composition of matter of our invention, when formed into insulators in accordance with our improved process, is also capable of resisting very high temperatures without deterioration.

One of the peculiarly advantageous uses of the insulating material of our invention is for the support of conductors, such as bus bars upon a switchboard, especially when the insulators are required to support considerable weight and to withstand high temperatures, the invention being useful in connection with conductors which are covered with other insulating material, as well as with bare conductors.

In general, the insulating material of our invention consists of a composition of cement and sand impregnated with an insulating material in fluid form. In accordance with our invention, the mixture of sand, cement and water is preferably molded when in a plastic state into the required form for subsequent use. After the cement mixture has become set, the molded form is impregnated with an electrical insulating fluid, or with an electrical insulator which can be reduced by heating or otherwise to a fluid state for the purpose of impregnating the molded forms. The particular fluid employed may be of various kinds, such as oils, asphaltums, bitumens, waxes or resinous products, or various compounds or mixtures of these or other similar substances.

In the practice of our invention, we prefer to use a high grade Portland cement, mixing it with fine sand in the proportions of approximately one part of cement to three parts of sand. In place of the sand, it is possible to use granulated stone or crushed gravel of a size adapted to form a suitable concrete. We prefer to include in the sand a small percentage of binding sand which is fine enough to pass through a fine mesh screen. We have found ten per cent. of this binding sand to give satisfactory result in certain instances, but the proper amount will vary with the coarseness of the balance of the sand, as will be understood by those skilled in the art. The sand and cement are mixed with sufficient water to wet the material and to cause it to set after it has been molded in molds having the form of the finished insulators. We prefer also to combine in this mixture a small quantity of any of the well known water proofing compounds. For example, we may use one per cent. of a water proofing compound containing a stearic acid base, such as the Medusa compound. This admixture of a water proofing compound aids in rendering the finished insulators impervious to moisture.

Many of the mineral and vegetable oils which are usually employed for electrical insulating purposes may be used in carrying out our invention. We prefer, however, to use asphaltum base. The preferred method of impregnating the cement insulator forms is to heat them to a high degree of temperature, thus expelling all of the moisture from the pores of the form. While still hot, the form is then plunged into the insulating fluid, which is absorbed until the pores of the insulator are saturated. This impregnation of the pores may be accomplished wholly or in part by boiling the fluid in which the insulator forms have been immersed. The boiling is continued preferably for a number of hours, and until the moisture is expelled from the pores of the insulator, the pores being filled in turn with the fluid. Upon the removal of the insulators from the bath of insulating fluid, the insulating material is permitted to dry or harden as the case may be, whereupon the insulators are ready for use.

The proportion of the fluid ingredients with respect to the other component parts of the mixture depends to a certain extent upon the physical forms into which the composition is molded, also upon the size of the pores in the molded forms. By proceeding as we have described, there is, however, no difficulty in securing the proportions suitable for the purpose.

While the impregnation of the molded forms after they have taken their final set is the preferred method, it will be apparent to those skilled in the art that the insulating fluid may be combined with the other elements of the composition in various other ways, and we do not wish therefore to be limited to the precise method of procedure which we have herein described in detail.

Our invention provides insulators which are not liable to water absorption, the presence of which is likely to destroy the insulating value of a porous medium. The insulating fluids which are used in carrying out our invention manifestly cannot be used for purposes in which strength and rigidity are required, except by the use of our invention.

Having described our invention therefore, we claim as new and desire to secure by Letters Patent:

1. The process of forming an electrical insulator which consists in mixing hydraulic cement, sand, waterproofing compound and water, molding said mixture, solidifying the molded form, evaporating the water therefrom, heating the form, and impregnating it while heated with an asphaltum insulating fluid.

2. The herein described composition of matter which consists of sand and hydraulic cement in the approximate proportions of three to one, a saponifiable waterproofing compound, and an insulating medium reducible to fluid form.

3. The herein described composition of matter which consists of sand, cement and a saponifiable waterproofing compound impregnated with a fluid insulating material.

4. The process of forming an electrical insulator which consists in mixing cement, sand, water-proofing compound and water, molding said mixture, solidifying the molded form, evaporating the water therefrom, heating the form, and impregnating it while heated with an insulating fluid.

5. The process of forming an electrical insulator which consists in mixing cement, sand, water-proofing compound and water, molding said mixture, solidifying the molded form, heating the form to expel all moisture and a large part of the air therefrom, and impregnating it while heated with an insulating fluid.

6. The process of forming an electrical insulator which consists in mixing hydraulic cement, sand, water-proofing compound and water, molding said mixture, solidifying the molded form, evaporating the water therefrom, heating the form, and then heating it in a fluid insulating material of solid consistency under normal temperatures.

7. The herein described composition of matter which consists of sand and hydraulic cement in the approximate proportions of three to one, stearic acid compound, and an insulating medium reducible to fluid form.

8. The herein described composition of matter which consists of sand, cement and stearic acid compound impregnated with a fluid insulating material.

In witness whereof we hereunto subscribe our names this 24th day of December, A. D. 1907.

CARL A. KELLER.
BERTRAND G. JAMIESON.

Witnesses:
LYNN A. WILLIAMS,
HARVEY L. HANSON.